(12) United States Patent
Hutzel et al.

(10) Patent No.: US 9,639,572 B2
(45) Date of Patent: May 2, 2017

(54) SQL ENHANCEMENTS SIMPLIFYING DATABASE QUERYING

(71) Applicants: Daniel Hutzel, Walldorf (DE); Timm Falter, Walldorf (DE); Stefan Baeuerle, Walldorf (DE)

(72) Inventors: Daniel Hutzel, Walldorf (DE); Timm Falter, Walldorf (DE); Stefan Baeuerle, Walldorf (DE)

(73) Assignee: SAP SE, Walldorf (DE)

( * ) Notice: Subject to any disclaimer, the term of this patent is extended or adjusted under 35 U.S.C. 154(b) by 538 days.

(21) Appl. No.: 14/020,610

(22) Filed: Sep. 6, 2013

(65) Prior Publication Data
US 2015/0074083 A1   Mar. 12, 2015

(51) Int. Cl.
*G06F 17/30* (2006.01)

(52) U.S. Cl.
CPC .. *G06F 17/30418* (2013.01); *G06F 17/30604* (2013.01)

(58) Field of Classification Search
None
See application file for complete search history.

(56) References Cited

U.S. PATENT DOCUMENTS

| 5,761,493 A | 6/1998 | Blakeley et al. |
|---|---|---|
| 5,836,777 A | 11/1998 | Chen |
| 5,956,706 A | 9/1999 | Carey et al. |
| 5,999,908 A | 12/1999 | Abelow |
| 6,038,558 A | 3/2000 | Powers et al. |
| 6,195,709 B1 | 2/2001 | Gupner et al. |
| 6,516,310 B2 | 2/2003 | Paulley |
| 6,560,598 B2 | 5/2003 | Delo et al. |
| 6,567,798 B1 | 5/2003 | Hollberg et al. |

(Continued)

OTHER PUBLICATIONS

Graphics: Display Method (SAP-SERM); SAP Library—BC Data Modeler; 2004; pp. 1-5.

(Continued)

*Primary Examiner* — Tyler Torgrimson
(74) *Attorney, Agent, or Firm* — Fountainhead Law Group P.C.

(57) ABSTRACT

Disclosed are techniques employed alone or in combination, to further enhance a database language and improve conciseness and comprehensiveness of query statements in application code. Embodiments may build upon an initial extension of database language to accommodate concepts of entity-relationship models (ERMs). That initial extension may include entities with structured types, and named associations. One technique modifies SQL to allow the SELECT command to specify element path expressions based upon a relationship (e.g. named associations between ERM elements). Another technique modifies SQL to introduce filter expressions suffixed to associations within path expressions, thus improving adherence to the principle of locality within query statements. Yet another technique allows a shorthand to "factor out" association path prefixes, thereby avoiding lengthy lists of path expressions in order to read several elements from the same nested structure or a same target entity behind a single association. Other techniques simplifying database querying are also disclosed.

15 Claims, 9 Drawing Sheets

(56) References Cited

U.S. PATENT DOCUMENTS

| | | | |
|---|---|---|---|
| 6,631,382 B1 | 10/2003 | Kouchi et al. |
| 6,732,084 B1 | 5/2004 | Kabra et al. |
| 6,799,184 B2 | 9/2004 | Bhatt et al. |
| 6,898,603 B1 | 5/2005 | Petculescu et al. |
| 6,938,041 B1 | 8/2005 | Brandow et al. |
| 6,957,214 B2 | 10/2005 | Silberger |
| 6,996,568 B1 | 2/2006 | Bedell et al. |
| 7,107,497 B2 | 9/2006 | McGuire et al. |
| 7,194,744 B2 | 3/2007 | Srivastava et al. |
| 7,225,197 B2 | 5/2007 | Lissar et al. |
| 7,290,181 B2 | 10/2007 | D'Angelo et al. |
| 7,302,447 B2 | 11/2007 | Dettinger et al. |
| 7,305,414 B2 | 12/2007 | Manikutty et al. |
| 7,340,451 B2 | 3/2008 | Sacco |
| 7,380,169 B2 | 5/2008 | Fossum et al. |
| 7,398,530 B1 | 7/2008 | Parla et al. |
| 7,421,448 B2 | 9/2008 | Spork |
| 7,434,230 B2 | 10/2008 | Harold et al. |
| 7,481,368 B2 | 1/2009 | Wang et al. |
| 7,505,983 B2 | 3/2009 | Wildhagen et al. |
| 7,523,090 B1 | 4/2009 | Sundman et al. |
| 7,631,012 B2 * | 12/2009 | Harvey ............ G06F 17/30454 |
| 7,640,357 B2 | 12/2009 | Kirov et al. |
| 7,653,828 B2 | 1/2010 | Kostadinov et al. |
| 7,672,960 B2 | 3/2010 | Anonsen |
| 7,680,782 B2 | 3/2010 | Chen et al. |
| 7,689,612 B2 | 3/2010 | Helsen et al. |
| 7,693,819 B2 | 4/2010 | Stoychev |
| 7,761,481 B2 | 7/2010 | Gaurav et al. |
| 7,765,222 B2 | 7/2010 | Styles et al. |
| 7,765,224 B2 | 7/2010 | Li et al. |
| 7,788,241 B2 | 8/2010 | Cheng et al. |
| 7,805,433 B2 | 9/2010 | Dickerman et al. |
| 7,818,754 B2 | 10/2010 | Morris et al. |
| 7,836,070 B2 | 11/2010 | Forstmann |
| 7,873,605 B2 | 1/2011 | Bhattacharyya et al. |
| 7,885,840 B2 | 2/2011 | Sadiq et al. |
| 7,895,226 B2 | 2/2011 | Koch et al. |
| 7,912,820 B2 | 3/2011 | Garden et al. |
| 7,917,549 B2 | 3/2011 | Arazi |
| 7,937,401 B2 | 5/2011 | Pasumansky et al. |
| 7,970,823 B2 | 6/2011 | Moeller et al. |
| 7,975,254 B2 | 7/2011 | Gilboa |
| 7,996,443 B2 | 8/2011 | Nori et al. |
| 8,005,850 B2 | 8/2011 | Walther et al. |
| 8,010,521 B2 | 8/2011 | Kissner et al. |
| 8,065,323 B2 | 11/2011 | Sallakonda et al. |
| 8,069,184 B2 | 11/2011 | Becker et al. |
| 8,078,643 B2 | 12/2011 | Mush et al. |
| 8,122,009 B2 | 2/2012 | Dettinger et al. |
| 8,146,103 B2 | 3/2012 | Schmidt et al. |
| 8,185,508 B2 | 5/2012 | Vemuri et al. |
| 8,191,081 B2 | 5/2012 | Schmidt et al. |
| 8,209,280 B2 | 6/2012 | Kearney et al. |
| 8,214,877 B1 | 7/2012 | Grimes et al. |
| 8,219,919 B2 | 7/2012 | Norring et al. |
| 8,250,094 B2 | 8/2012 | Skaria et al. |
| 8,255,368 B2 | 8/2012 | Cox |
| 8,281,283 B2 | 10/2012 | Speth et al. |
| 8,286,916 B2 | 10/2012 | Pauly et al. |
| 8,321,478 B2 | 11/2012 | Fong |
| 8,327,260 B2 | 12/2012 | Bays et al. |
| 8,347,207 B2 | 1/2013 | Borgsmidt et al. |
| 8,364,300 B2 | 1/2013 | Pouyez et al. |
| 8,364,724 B2 | 1/2013 | Stolte et al. |
| 8,370,400 B2 | 2/2013 | Brunswig et al. |
| 8,375,041 B2 | 2/2013 | Webster et al. |
| 8,386,916 B2 | 2/2013 | LeBrazidec et al. |
| 8,407,215 B2 | 3/2013 | Sheedy et al. |
| 8,407,237 B1 | 3/2013 | Kudryavtsev et al. |
| 8,407,262 B2 | 3/2013 | Hsu et al. |
| 8,407,309 B1 | 3/2013 | Feldman et al. |
| 8,412,673 B2 | 4/2013 | Weissenberger et al. |
| 8,417,732 B2 | 4/2013 | Rapp |
| 8,429,176 B2 | 4/2013 | Sigurbjornsson et al. |
| 8,473,506 B2 | 6/2013 | Sedlar et al. |
| 8,478,515 B1 | 7/2013 | Foucher et al. |
| 8,478,850 B2 | 7/2013 | Delany et al. |
| 8,484,210 B2 | 7/2013 | Loh et al. |
| 8,489,649 B2 | 7/2013 | Yalamanchi et al. |
| 8,504,522 B2 | 8/2013 | Wu et al. |
| 8,504,568 B2 | 8/2013 | Chandrasekhara et al. |
| 8,505,032 B2 | 8/2013 | Craddock et al. |
| 8,510,296 B2 | 8/2013 | Fan et al. |
| 8,515,982 B1 | 8/2013 | Hickman et al. |
| 8,805,875 B1 | 8/2014 | Bawcom et al. |
| 8,849,771 B2 | 9/2014 | Berg-Sonne |
| 9,047,334 B1 | 6/2015 | Cheriton |
| 9,182,956 B2 * | 11/2015 | Zalmanovici ........... G06F 8/443 |
| 2002/0100014 A1 | 7/2002 | Iborra et al. |
| 2002/0138820 A1 | 9/2002 | Daly |
| 2003/0009649 A1 | 1/2003 | Martin et al. |
| 2003/0135850 A1 | 7/2003 | Miloushev et al. |
| 2003/0140036 A1 | 7/2003 | Belowsov |
| 2003/0145255 A1 | 7/2003 | Harty et al. |
| 2004/0117759 A1 | 6/2004 | Rippert, Jr. et al. |
| 2004/0122817 A1 | 6/2004 | Kaiser |
| 2004/0153435 A1 | 8/2004 | Gudbjartsson et al. |
| 2004/0249856 A1 | 12/2004 | Garden et al. |
| 2005/0004904 A1 | 1/2005 | Kearney et al. |
| 2005/0010565 A1 | 1/2005 | Cushing et al. |
| 2005/0010581 A1 * | 1/2005 | Doan .................... G06F 17/272 |
| 2005/0065958 A1 | 3/2005 | Dettinger et al. |
| 2005/0187952 A1 | 8/2005 | Werner |
| 2005/0256889 A1 | 11/2005 | McConnell |
| 2005/0283459 A1 | 12/2005 | MacLennan et al. |
| 2006/0195460 A1 | 8/2006 | Nori et al. |
| 2006/0195476 A1 | 8/2006 | Nori et al. |
| 2006/0215448 A1 | 9/2006 | Ellis et al. |
| 2006/0224634 A1 | 10/2006 | Hahn et al. |
| 2006/0235834 A1 | 10/2006 | Blakeley et al. |
| 2006/0242104 A1 | 10/2006 | Ellis et al. |
| 2006/0259912 A1 | 11/2006 | Weinrich et al. |
| 2007/0083572 A1 | 4/2007 | Bland et al. |
| 2007/0118501 A1 | 5/2007 | Yan |
| 2007/0136335 A1 | 6/2007 | Dionne et al. |
| 2007/0219976 A1 | 9/2007 | Muralidhar et al. |
| 2007/0226203 A1 * | 9/2007 | Adya ................ G06F 17/30418 |
| 2008/0065862 A1 | 3/2008 | Hansen et al. |
| 2008/0071799 A1 | 3/2008 | Evans et al. |
| 2008/0091691 A1 | 4/2008 | Tsuji |
| 2008/0120604 A1 | 5/2008 | Morris |
| 2008/0133530 A1 | 6/2008 | Wang et al. |
| 2008/0222159 A1 | 9/2008 | Aranha et al. |
| 2008/0301168 A1 | 12/2008 | Adler et al. |
| 2009/0240664 A1 | 9/2009 | Dinker et al. |
| 2009/0292730 A1 | 11/2009 | Li et al. |
| 2009/0319546 A1 * | 12/2009 | Shaik ................ G06F 17/30563 |
| 2010/0082646 A1 | 4/2010 | Meek et al. |
| 2010/0114935 A1 | 5/2010 | Polo-Malouvier et al. |
| 2010/0131568 A1 | 5/2010 | Weinberg et al. |
| 2010/0241637 A1 | 9/2010 | Kissner et al. |
| 2010/0293523 A1 | 11/2010 | Ahadian et al. |
| 2010/0318499 A1 | 12/2010 | Arasu et al. |
| 2011/0154226 A1 | 6/2011 | Guertler et al. |
| 2011/0161371 A1 | 6/2011 | Thomson et al. |
| 2011/0225176 A1 | 9/2011 | Siegel et al. |
| 2011/0231454 A1 | 9/2011 | Mack |
| 2011/0238437 A1 | 9/2011 | Zhou et al. |
| 2011/0302212 A1 | 12/2011 | Agrawal et al. |
| 2012/0005190 A1 | 1/2012 | Faerber et al. |
| 2012/0016901 A1 | 1/2012 | Agarwal et al. |
| 2012/0054142 A1 | 3/2012 | Du et al. |
| 2012/0059802 A1 | 3/2012 | Daniello et al. |
| 2012/0109661 A1 | 5/2012 | Lueckhoff |
| 2012/0130942 A1 | 5/2012 | Dipper et al. |
| 2012/0131392 A1 | 5/2012 | Bendig |
| 2012/0136868 A1 | 5/2012 | Hammerschmidt et al. |
| 2012/0143810 A1 | 6/2012 | Berg-Sonne |
| 2012/0144383 A1 | 6/2012 | Mishra et al. |
| 2012/0215768 A1 | 8/2012 | Zellweger |
| 2012/0239987 A1 | 9/2012 | Chow |
| 2012/0265734 A1 | 10/2012 | Perez et al. |
| 2013/0110879 A1 | 5/2013 | Winternitz et al. |

(56) References Cited

U.S. PATENT DOCUMENTS

| | | | |
|---|---|---|---|
| 2013/0111310 A1 | 5/2013 | deOliveira et al. |
| 2013/0117346 A1 | 5/2013 | Figus |
| 2013/0151560 A1 | 6/2013 | Zurek |
| 2013/0159354 A1 | 6/2013 | Heinzl et al. |
| 2013/0166602 A1 | 6/2013 | Brunswig et al. |
| 2013/0246355 A1 | 9/2013 | Nelson et al. |
| 2014/0149180 A1 | 5/2014 | Yaseen et al. |
| 2014/0245079 A1 | 8/2014 | Larson et al. |
| 2014/0258777 A1 | 9/2014 | Cheriton |
| 2014/0330916 A1 | 11/2014 | Xu et al. |
| 2014/0380266 A1 | 12/2014 | Bornhoevd et al. |

OTHER PUBLICATIONS

Abovesoft Utilities; www.AboveSoft.com; Sep. 2010; pp. 1-6.
Ayers, Lonnie, PMP; SAP BW Data Modeling; SAP-BW Consulting, Inc.; pp. 1-18 Printed Aug. 29, 2013.
Heilman, Rich, Hana Product Management, SAP Labs LLC; STEYN, Werner, Customer Solution Adoption, SAP Labs, LLC; SAP HANA SQL Script Basics & Troubleshooting; Oct. 2012; pp. 1-47.
Pattern: Fill Transient Attributes of Persistent Nodes; SAP; Jul. 6, 2013; p. 1.
Ruby on Rails Guides, "Active Record Validations," Aug. 8, 2013, downloaded from the Internet at <url>https://web.archive.org/web/20130808005838/http://guides.rubyonrails.org/active_record_validations.html on Aug. 27, 2015, pp. 1-37.
Bhargava, "Concurrency control in database systems," 1999, IEEE Transactions on Knowledge and Data Engineering, vol. 11, Issue 1, pp. 3-16.
Paton et al., "Identification of database objects by key," 2005, Advances in Object-Oriented Database Systems, vol. 334 of the series Lecture Notes in Computer Science, pp. 280-285.
7arber et al., "SAP HANA database: data management for modem business applications," 2011, ACM SIGMOD Record, vol. 40 Issue 4, pp. 45-51.

* cited by examiner

SQL ENHANCEMENTS SIMPLIFYING DATABASE QUERYING

BACKGROUND

Embodiments relate to databases, and in particular, to enhancements of database language that simplify querying.

Unless otherwise indicated herein, the approaches described in this section are not prior art to the claims in this application and are not admitted to be prior art by inclusion in this section.

A database is a powerful tool for the storage, organization, and analysis of large volumes of data. At a low level, a database may employ fundamental data definition and processing that is based upon a relational model. In particular, data definition defines data types with sufficient metadata being associated therewith. Data definition may also involve definition of a database structure such as columns and tables. Many database structures rely upon Structured Query Language (SQL) as the standard approach to define, read, and manipulate data within a database. In its standard form, SQL itself reflects the basic relational model of the database. Various other types of applications (e.g. toolsets) are constructed by developers to allow consumers to interact with the database in an efficient and intuitive manner. Such applications are typically provided in an application layer overlying the database.

The overlying applications, such as consumer technology and toolsets provided by developers, may introduce higher-level models, e.g., entity-relationship models (ERMs) in order to contribute semantics and ease consumption by the user. In particular, a plain data model on the SQL level only contains the requisite information to process data on the SQL level. Adding more information in a declarative fashion can also make data models more comprehensible, thereby easing their consumption by users.

One example of a higher-level models is an OData Entity Model (EDM) In particular OData is a web protocol standard providing platform-agnostic interoperability for querying and updating data. OData leverages web technologies such as HTTP, Atom Publishing Protocol (AtomPub), and JSON (JavaScript Object Notation) in order to provide access to information from a variety of applications. The simplicity and extensibility of OData can provide consumers with a predictable interface for querying a variety of data sources.

Other examples of higher-level models may include the Semantic Layer in the Business Intelligence (BI) platform of SAP AG in Walldorf, Germany, Java Persistence API (JPA) and enterprise objects in Java, or the business objects frameworks in Advanced Business Application Programming (ABAP) of SAP AG. Also, the River programming model and the River Definition Language (RDL) of the River application development framework for SAP AG in Walldorf, Germany are based on entities linked by relationships.

Even though those higher-level models may share many commonalties, the individual information cannot be shared across stacks. That is, the higher-level models mentioned above contribute essentially the same kind of additional information, yet that information is provided in different ways that interfere with its being shared across higher level models (e.g., between an OData EDM, and an ERM created using RDL).

This situation results in a fragmented environment with information unable to be shared between applications. To cope with this fragmentation, redundant information is provided, with application developers and customers contributing the same essential information in multiple forms, thereby undesirably increasing overhead.

Moreover, while the developers of consumer technologies may have some knowledge of SQL, they are generally not experts in complex SQL programming Thus, there is a need for an improved language for interacting with relational databases.

SUMMARY

Disclosed are techniques employed alone or in combination, to further enhance a database language and improve conciseness and comprehensiveness of query statements in application code. Embodiments may build upon an initial extension of database language to accommodate concepts of entity-relationship models (ERMs). That initial extension may include entities with structured types, and named associations. One technique modifies SQL to allow the SELECT command to specify element path expressions based upon a relationship (e.g., named associations between ERM elements). Another technique modifies SQL to introduce filter expressions suffixed to associations within path expressions, thus improving adherence to locality within query statements. Yet another technique allows a shorthand to "factor out" association path prefixes, thus avoiding lengthy lists of path expressions in order to read several elements from the same nested structure, or a same target entity behind a single association. Other techniques simplifying database querying are also disclosed.

An embodiment of a computer-implemented method comprises providing in a database layer, a database engine and a database comprising data organized according to a relational model. Provided in an application layer, are an entity relationship data model and a query engine in communication with the database engine. The database engine is caused to receive from the query engine, a query in a database language extended to include an entity type and an association, the query further comprising a path expression specifying a relationship between a specified entity and an associated entity. The database engine is caused to return to the query engine, a query result comprising data of the associated entity fetched along the path expression.

An embodiment of a non-transitory computer readable storage medium embodies a computer program for performing a method comprising providing in a database layer, a database engine and a database comprising data organized according to a relational model. Provided in an application layer, are an entity relationship data model and a query engine in communication with the database engine. The database engine is caused to receive from the query engine, a query in a database language extended to include an entity type and an association, the query further comprising a path expression specifying a relationship between a specified entity and an associated entity. The database engine is caused to return to the query engine, a query result comprising data of the associated entity fetched along the path expression.

An embodiment of a computer system comprises one or more processors and a software program executable on said computer system. The software program is configured to provide in a database layer, a database engine and a database comprising data organized according to a relational model. The software program is further configured to provide in an application layer, an entity relationship data model and a query engine in communication with the database engine. The database engine is caused to receive from the query engine, a query in a database language extended to include an entity type and an association, the query further comprising a path expression specifying a relationship between a specified entity and an associated entity. The database engine is caused to return to the query engine, a query result comprising data of the associated entity fetched along the path expression.

In certain embodiments, the path expression comprises a filter element suffix.

According to some embodiments, the path expression further comprises a shorthand factoring out an association path prefix.

In various embodiments, the database language comprises SQL.

According to particular embodiments, the query comprises SELECT and FROM clauses presented in a revised order.

In certain embodiments, the database comprises an in memory database.

The following detailed description and accompanying drawings provide a better understanding of the nature and advantages of various embodiments.

DETAILED DESCRIPTION

Described herein are techniques for enhancing a database language to simplify database querying. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Disclosed are a number of techniques, which may be employed alone or in combination, in order to further enhance a database language and improve conciseness and comprehensiveness of query statements in application code. Embodiments may build upon an initial extension of database language to accommodate concepts of entity-relationship models (ERMs). That initial extension may include entities with structured types, and named associations.

As discussed in further detail below, one technique that enhances this initial extension, modifies Structured Query Language (SQL) to allow the SELECT command to specify element path expressions based upon a relationship (e.g., named associations between ERM elements).

Another enhancing technique, modifies extended SQL to introduce filter expressions suffixed to associations within path expressions, thus improving adherence to locality within query statements.

Another enhancing technique, allows a shorthand to "factor out" association path prefixes, thus avoiding lengthy lists of path expressions in order to read several elements from the same nested structure, or a same target entity behind a single association.

Another enhancing technique provides an alternative way to specify projection/select clauses in line with nested projection clauses as SELECT from <entity>{ . . . }.

One principle underlying these various techniques is that the enhanced query language be a superset of the standard database language (e.g. standard SQL). This may be expressed in the following way:

(Standard) SQL+QL extensions [+host language-specific adaptations]

The components have the following meanings. Here, (Standard) SQL refers to standard SQL. That is, any standard SQL constructs are supported.

The term query language (QL) extensions is described in connection with various embodiments herein. Those QL extensions are designed in a non-intrusive way, remaining close to SQL.

The term host language-specific adaptations, refers to certain adaptions to syntax details allowed when embedding into programming languages like RDL, Java, ABAP.

Figure 8:
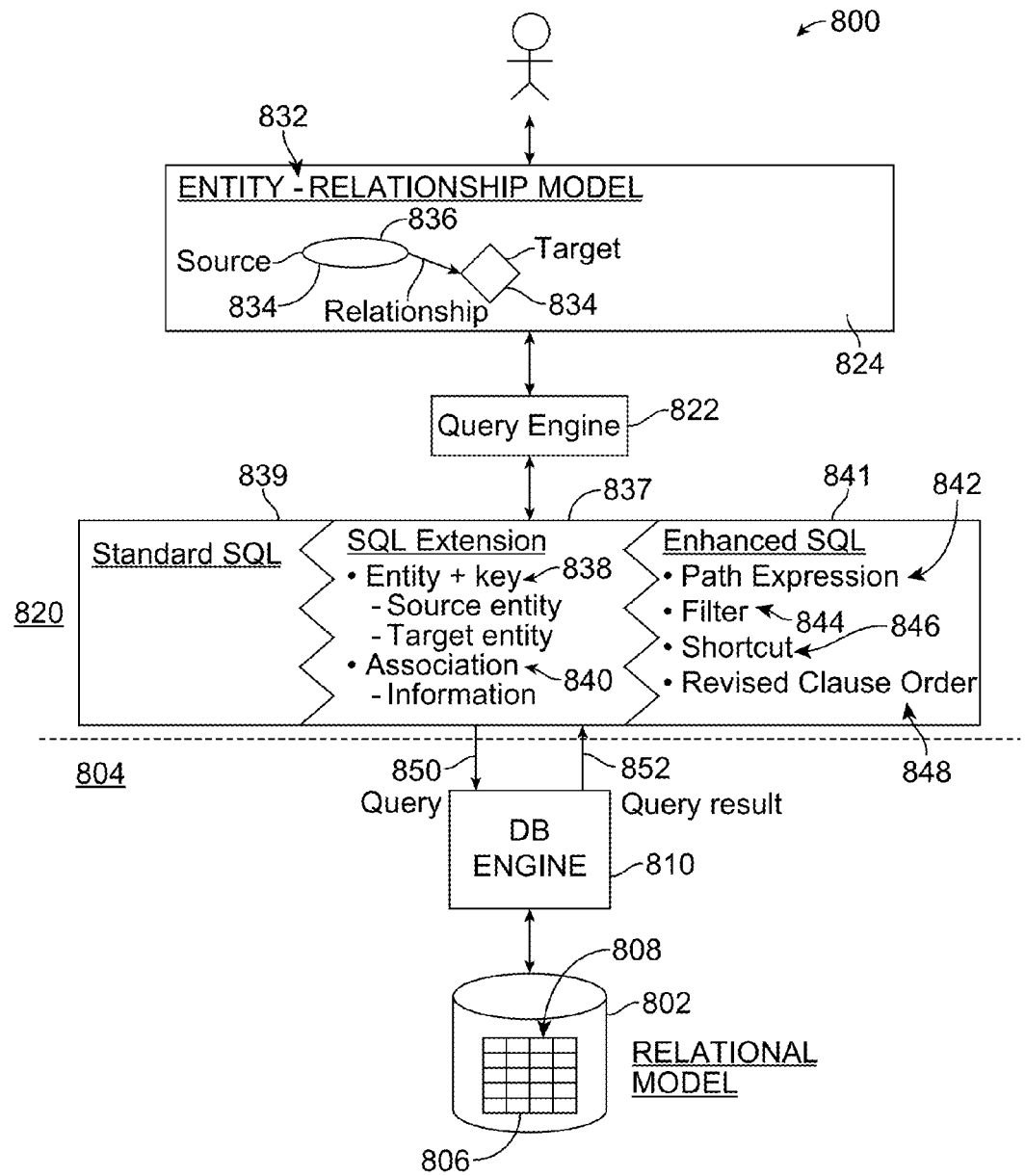
FIG. 8 shows an embodiment of a database system according to an embodiment.

A summary of the enhanced query language is now provided. FIG. 8 provides a simplified view of database system.

In particular, FIG. 8 shows system 800 comprising a database 802 located within a database layer 804. The data within the database may be organized as a table 806 comprising similar types of information grouped into columns 808.

A database engine 810 is also located in the database layer 804. The database engine 810 operates to control the flow of data to and from the database 802. In particular, the database engine 810 controls the flow of data between the database 802 and an overlying application layer 820.

The application layer 820 comprises a query engine 822 that is configured to communicate with the database engine 810. The application layer 820 further includes a data model 824 that organizes data of the underlying database 802, in ways that are useful to an end user 830.

For example, the data model of the application layer 820 may be at a higher-level than the relational model according to which the database is organized. Specifically, one such higher level data model is an entity-relationship model (ERM) 832.

The ERM 832 comprises a collection of individual entities 834, linked together by specific relationships 836. An initial extension 837 of the database language 839 to provide elements (entities 838, associations 840) recognizing and accommodating the entity and relationship concepts of the higher level ERM model 832, is discussed in detail later below in connection with FIGS. 1-7.

However, described immediately below are a collection of techniques that may be employed alone or in combination as a further enhancement 841 that initially extended database language. Certain of these techniques may provide a path expression 842 specifying a relationship along which data of an associated entity may be fetched as part of a query. Other techniques may include but are not limited to filter expressions 844, shortcuts 846, and revised clause orders 848.

One or more of these techniques can be incorporated into a query 850 that is issued from the query engine to the database engine 810. Based upon the query and the database language present therein, the database engine 810 is configured to return to the query engine, a query result 852 comprising data selected from the database 802 on the basis of the query, including extensions and/or enhancements thereof, as are described in detail below.

Figure 9:
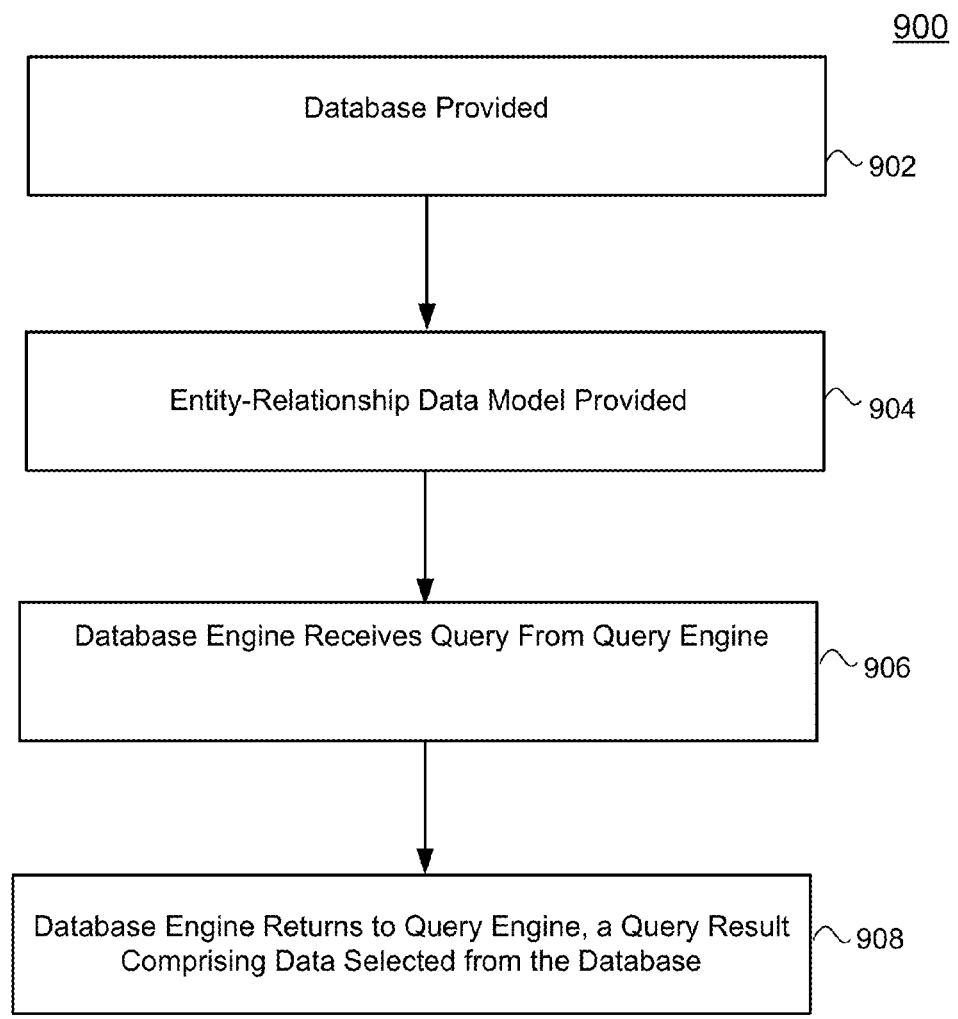
FIG. 9 shows an embodiment of a simplified process flow according to an embodiment.

FIG. 9 provides a simplified flow diagram of a method 900 according to an embodiment. Specifically, in a first step 902 a database comprising data organized according to a relational model, is provided in a database layer with a database engine. In a second step 904, an entity-relationship data model is provided in an application layer with a query engine.

In a third step 906, the database engine is caused to receive from the query engine, a query formulated in an extended database language comprising an entity type and an association, the query further comprising path expression reflecting a relationship between a first specified entity and a second specified second entity.

In a fourth step 908, the database engine is caused to return to the query engine, a query result comprising data selected from the database on the basis of the path expression.

Syntax that may be employed for the enhancement techniques is now described. Starting from the base syntax of standard SQL, the following describes the syntax for extensions being added.

```
query =
SELECT [ quantifier ] selectClause FROM fromClause
    [ WHERE filterClause ] [_WITH PARAMETERS paramsClause_]
    [ GROUP BY groupByClause ]
    [ HAVING havingClause ]
    [ ORDER BY orderByClause ]
quantifier = DISTINCT | ALL
selectClause = "*" | elementClause ( "," elementClause )*
joinClause = [ LEFT | RIGHT | OUTER | INNER ] JOIN entity [[AS]
    name ] ON filterClause
entityName = QualifiedName
entityNameOrAlias, alias, elementName, param = Identifier
fromClause = entityName [[AS] alias] joinClause* | projectionClause
elementClause = ( [ entityNameOrAlias "." ] element | expr ) [ AS
    alias ] | projectionClause
element = elementName ["[" filterClause "]"] [ "." element ]
projectionClause =
    entityName ["[" filterClause "]"] [[AS] alias] joinClause* "{"
    selectClause "}"
    | element [AS alias] joinClause* [ flattened ] "{" selectClause "}"
    | "{" selectClause "}" AS alias
flattened = "."
paramsClause = param ":" expr [ "," paramsClause ]
```

Above, the phrases:

```
[_WITH PARAMETERS paramsClause_]
'| projectionClause'
'["[" filterClause "]"]'; and
'[ "." element ]'
``` reflect the individual locations where standard SQL is being enhanced according to techniques as described herein.

To comply with SQL, implementations adhere to compliance level 0. This is defined as follows:

§1 SQL-level Consumability: data models are consumable through conventional/standard SQL. This calls for white-box mapping of entity and views to plain relational models, i.e., flat tables.

§2 SQL DDL Interoperability: data models created in the conventional relational model are consumable through enhanced QL.

Thus CDS-based data models are consumable through standard SQL. Furthermore, CDS is not an abstraction or mapping layer on top of relational models and SQL. Rather, CDS is a compatible extension to SQL.

Details of the enhanced Query Language (QL) techniques are now discussed in detail. The following specifies and explains the extensions, while referring to 'standard' SQL as the base language. The following is an abbreviated syntax definition for standard SQL:

```
query =
SELECT [ quantifier ] selectClause FROM fromClause [ WHERE
    filterClause ]
    [ GROUP BY groupByClause ]
    [ HAVING havingClause ]
    [ ORDER BY orderByClause ]
quantifier = DISTINCT | ALL
selectClause = "*" | elementClause ( "," elementClause )*
elementClause = ( [ entityNameOrAlias "." ] element | expression )
    [ AS columnAlias ]
element = elementName
fromClause = entityName [[AS] tableAlias] joinClause*
joinClause = [ LEFT | RIGHT | OUTER | INNER ] JOIN entity [[AS]
    name ] ON filterClause
entityName = QualifiedName
tableAlias, elementName, columnAlias = Identifier
entityNameOrAlias = entityName | tableAlias
```

Embodiments introduce the following extensions to that syntax:

```
element += ( "." element )*              -- Element path expressions
element += [ "[" filterClause "]" ]      -- XPath-like filter
                                            expressions
elementClause += | projectionClause      -- Nested projection clauses
fromClause += | projectionClause         -- Alternative from/select
                                            clauses
query += [WITH PARAMETERS                -- for passing parameters to
paramsClause ]                              views
projectionClause =
    entityName ["[" filterClause "]"] [[AS] alias] joinClause* "{"
    selectClause "}"
    | element [AS alias] joinClause* [ flattened ] "{" selectClause "}"
    | "{" selectClause "}" AS alias
flattened = "."
```

Details regarding implementation of these extensions is now provided below.

Path Expressions Address Nested or Target Elements

The use of path expressions in extended SQL is now illustrated in connection with the following data model. In particular, that data model defines the entities Address and Employee as shown below:

```
entity Address {
    owner : Association to Employee; // can be used for :m associations
    streetAddress; zipCode; city; // snipped type defs
    kind : enum { home, business };
}
entity Employee {
    addresses : Association[0..*] to Address via backlink owner;
    homeAddress = addresses[kind=home]; // ◇ using XPath-like filter.
```

Under some circumstances, it may be desirable to write a query statement in standard SQL for this data model, as follows:

```
SELECT e.id, e.name, a.zipCode FROM Employee e
LEFT OUTER JOIN Employee2Address e2a ON e2a.employee = e.id
LEFT OUTER JOIN Address a ON e2a.address = a.id AND a.type=
'homeAddr'
WHERE ...
```

This statement, however, may already be too complex for many application developers. Thus, code patterns similar to that given below, may be used in some pseudo languages:

```
customers = SELECT * FROM Customer
foreach c in customers do
    write c.id
    write c.name
    addresses = SELECT * FROM Address a, $Customer2Address c2a
        WHERE a.id = c2a.address AND c2a.customer = :c.id
    foreach a in addresses do
        if a.type = 'homeAddr' then write a.zipCode
    end
end
```

There are several issues with the code presented immediately above. One issue is the use of an imperative coding style with loops in loops, resulting in 1+n queries being executed or too much data being fetched with SELECT *.

Embodiments as described herein, however, allow SQL to be extended to express path expressions along relationships. This allows the cumbersome standard SQL query expression above, to instead be written as:
SELECT id, name, homeAddress.zipCode FROM Employee WHERE . . .

Within this sample snippet, a path expression along a relationship is used to fetch data from an associated entity. Here, the path expression "homeAddress.zipCode" is used to fetch home address and zip code data for the associated entity "Employee".

In particular, path expressions allow addressing of elements in nested structures or in entities referred to by associations. As an example, given the data model introduced above, nested elements can be accessed and JOIN simplified, through simple path expressions as follows.
SELECT name, salary.value, orgunit.costcenter FROM Employee;
Here, salary.value is a structured type, and orgunit.costcenter is an association.

This would correspond to the following more complex statement in standard SQL:
SELECT e.name, e."salary.value", ou.costcenter FROM Employee e
JOIN OrgUnit ou ON e.orgunit_ID=ou.ID;
Syntax for the path expression is as follows:

```
element = [ entityNameOrALias "." ] elementPath
elementPath = elementName [ "." elementPath ]
```

The types of leading elements are expected to be structured or associations.
Rules for path expressions are as follows.
If an element has a structured type, nested elements can be referred to using the dot-separated path notation ("."). Reflected to standard SQL, this is mapped to a simple access to the nested element's column within the same table.

If an element has an association type, elements of the target entity can be referred to using the dot-separated path notation. Reflected to standard SQL, this is expanded to a JOIN from the source entity to the target entity (possibly a twofold JOIN, in an intermediate link table) and access to the element's column within the target entity in the select clause.

If neither of the above apply, no trailing ("." element)* is allowed. Violation of this rule can result in a compilation error.

This is repeated for each path element.

Certain implications are noted for path expressions across associations with :m cardinality. This is referenced in the discussion of :m cardinality presented later in this document.

Although reading from structured sources, the result set of the examples above remain flat. The names of elements in the result sets resulting from such path expressions, is the name of the last element in the path. This can be renamed using the [AS alias].

In the event of name conflicts, a compiler error is raised, and an alias specified. An example is shown below:

```
SELECT name, manager.name FROM OrgUnit //  → results in a naming
conflict error
SELECT name, manager.name AS managerName FROM OrgUnit // → ok
```

The result set type structure of the second query is: {name, managerName}

XPath-Like Filter Expressions

Another technique which can be used to simplify query expressions, is the introduction of filter expressions within path expressions. Specifically, instead of collecting all filter conditions in the central WHERE clause at the end, embodiments introduce filter expressions which can be suffixed in square brackets [ ] to associations within path expressions, similar to filter expressions in XPath.

As used herein, "XPath-like filters" refers to adopting the element [<expr>] syntax style of XPath, not the full semantic nor the expression syntax of XPath. An example is as follows.

```
SELECT FROM Employee {
    name,
    addresses[kind=home].city AS homeTown,
    addresses[kind=business].city AS businessTown
}
```

The syntax is as follows:

```
elementPath = elementName ["[" filterClause "]"] ["."
    elementPath ]
projectionClause += |
    entityName ["[" filterClause "]"] [[AS] alias] JoinClause*
    "{" selectClause "}"
```

Filter expressions can only be appended to elements with association type.

XPath-like filter expressions improve both expressiveness and comprehensiveness. XPath-like filter expressions may also improve adherence to the principle of locality within query statements.

For instance, the following attempt to express the above example without that option:

```
SELECT FROM Employee {
    name, addresses.city
}
WHERE addresses.kind=home OR addresses.kind=business
``` is not only inferior with respect to capturing intent, it also has the flaw to return duplicates for the employee name:

Any valid filter expression can be used within the square brackets, which could also be used in a WHERE clause. Element names showing up in these expressions are resolved within the scope of the target entity's type structure.

Sibling elements of the association can be referred to by prefixing an element with a ".", elements from the scope above with "..", etc.

Embodiments may provide XPath-like filters applied to a FROM clause. This allows queries to be written without classic WHERE clauses, by applying XPath-like filters also on the outermost scope.

For example, the following a query could be used to show the list of cities where employees in TIP with a salary >$100.000 live:

```
SELECT DISTINCT FROM OrgUnit[boardarea='TIP']
    .employees[salary>'$100.000'] {
        addresses [kind=home].city, count(*)
    }
```

The syntax enhancement in the definition of projection-Clause, is shown elsewhere.

Nested Projection Clauses

Rather than writing lengthy lists of path expressions to read several elements from the same nested structure or a same target entity behind a single association, embodiments apply a shorthand by 'factoring out' the association path prefix. Some examples are given below.

In particular, the following syntax:

```
SELECT id, name,
    homeAddress.streetAddress,
    homeAddress.zipCode,
    homeAddress.city
FROM Emloyee
``` could instead be written in the following shorthand variant:

```
SELECT id, name, homeAddress.{ streetAddress, zipCode, city } FROM Emloyee
```

The second query is semantically and behaviorally the same as the first. This is true for its result set type structure, which in both cases is a flat table with five columns In the syntax, this is reflected by:

```
elementClause    +=  |  projectionClause
projectionClause = element [AS alias] joinClause* [ flattened ]
    "{" selectClause "}"
flattened = "."
```

In one example a constraint can specify that a nested select clause can only be placed behind path expressions whose last element's type is structured or an association. Violating this constraint can result in a compilation error.

From a grammatical perspective, the introduction of nested projection clauses has the effect of recursive application of a "{" selectClause "}", as a select clause is in turn a comma-separated list of element clauses.

If the optional flattened symbol '.' is present before a nested projection clause's opening parenthesis, the elements selected from the nested structure or from an association's target entity, are 'flattened' into the parent scope within the result set. If the optional flattened symbol '.' is omitted, a nested structure is preserved corresponding to the structure of the nested projection clause.

An example is now presented in connection with the query shown above.

```
SELECT id, name, homeAddress.{ streetAddress, zipCode, city } FROM Employee
```

This query returns a result set with the following type:

```
<Result Set> {
    id, name, streetAddress, zipCode, city
}
```

In contrast, here is the same query omitting the flattening '.'.

```
SELECT id, name, homeAddress { streetAddress, zipCode, city } FROM Employee
→ returning a result set with the following type:
<Result Set> {
    id, name, homeAddress {
        streetAddress, zipCode, city
    }
}
```

This rule applies in a same way to both structured elements as well as associations.

Returning ad-hoc nested structures are now discussed. In addition to referring to existing structure types in source entities and preserving corresponding nested structures in the result set, new nested structures in a result set from a set of elements in a given scope may be created.

For example, the following query:

```
SELECT { name, salary } AS employee, orgunit.manager { name, salary }
    FROM Employee
``` returns a result set with the following type:

```
<Result Set> {
    employee { name, salary }
    manager { name, salary }
}
```

In the syntax, this is reflected by:
projectionCLause+=|"{" selectCLause "}" AS alias The first nested projection clause in the example above, is not prepended with a reference to an element. Thus, the contained element names are resolved in the outer scope, in this case the structured type of entity Employee. An alias is to be specified to give the resulting structured element a name in the result set.

Revised SQL Clauses Order: SELECT . . . From <Entity>

In addition to the classic SELECT . . . from <entity>, an alternative way to specify projection/select clauses in line with nested projection clauses, is introduced as SELECT from <entity> { . . . }.

For example, instead of writing a query like:

```
SELECT name, homeAddress {
    streetAddress, zipCode, city
}
FROM Employee;
```

That query can alternatively be written as follows:

```
SELECT FROM Employee {
    name, homeAddress {
        streetAddress, zipCode, city
    }
};
```

Syntax is as follows:

```
fromClause += | projectionClause
projectionClause += | entityName [[AS] alias] joinClause*
    "{" selectClause "}"
```

Given the syntax for nested projection clauses as introduced above, it is reused for a FROM clauses variant as shown above. In one example, a constraint can exist specifying that when making use of this syntax variant, the select clause between SELECT and FROM is expected to be empty. Violating this constraint results in a compilation error.

Nested projection clauses may be attributed to the fact that whenever a structured type is referred to (through an element with structured type, or an association referring to an entity with structured type) elements can be selected using the { . . . } as a projection clause, which can be applied recursively. This may be consistently applied also to the root scope of a query referred to by the entity named in the FROM clause.

As a possible benefit, projection clauses follow the pattern of <structured type> (elements), starting with the entity behind the FROM keyword, and nested along resolved associations or structured elements. This allows a consistent 'recursive' syntax definition, and subsequent benefits. One such benefit is the ability to provide code completion in editors based on what has already been typed in by the developer.

As mentioned previously, embodiments may build on the extension of the database language to accommodate concepts of higher level models, for example entity-relationship models. Such an initial extension using the SQL database language as an example, is discussed in detail below in connection with FIGS. 1-7. In summary, that initial extension of the database language involves providing entities with structured types and named associations.

Associations and Structured Elements in Result Sets

Without having to apply any of the further enhancements to SQL that are detailed above, the initially extended database language behavior described in detail below, is applied for selecting associations and structured elements in a query. This consequently results in structured result sets.

For example, the following query refers to the structured element salary and to the association orgunit in its SELECT clause.

SELECT name, salary, orgunit FROM Employee;

The result set for this query is as follows (payload data only, metadata not shown):

```
<ResultSet> {
    name,
    salary : Amount {
        value, currency
    },
    orgunit : Association to OrgUnit {
        _id
    }
}
```

Although a structured type, this result set is still 'essentially flat'. That is, it lacks to-many cardinality changes among the elements. In fact, the above result set could internally also be represented as:

{name, "salary.value", "salary.currency", "orgunit._id"}.

Consequently, for structured elements, entities having structured types lead to structured result sets as shown above. The respective element's type in the result set, corresponds to the type used in the definition model. This assumes the types are also represented in the host language.

For associations, in a manner analogous to how associations are represented in the discussion of DDL below, such associations are returned in the result set as nested structures with respective foreign key elements inside (if applicable):

for :1 associations: the returned foreign key value(s) allow to fetch the target record;

for :m associations: no foreign key values are returned; the relationship is established through foreign key(s) on the target side or in a link table.

Complemented with the metadata for the association element, this information can later be used to fetch the record from the target entity referred to by an association. This is discussed in connection with associations in FROM clauses.

Reflection support is provided as follows. Having metadata associated with association elements in result sets, requires that in addition to the payload data, relevant metadata available is provided to the consumer. This may be a local consumer in the same address space, or a remote consumer as in an ABAP or Java container, up to user interfaces (UIs) with JavaScript or native clients. This also covers associations obtained through projections from the query through intermediate views.

The instant discussion turns now to examine in detail the initial extension of the database language that provided entities with structured types and named associations.

SQL Extended to Accommodate ERMs

Described herein are techniques for extending a relational model-based database language (e.g. Structured Query Language—SQL), to accommodate higher level entity-relationship models. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
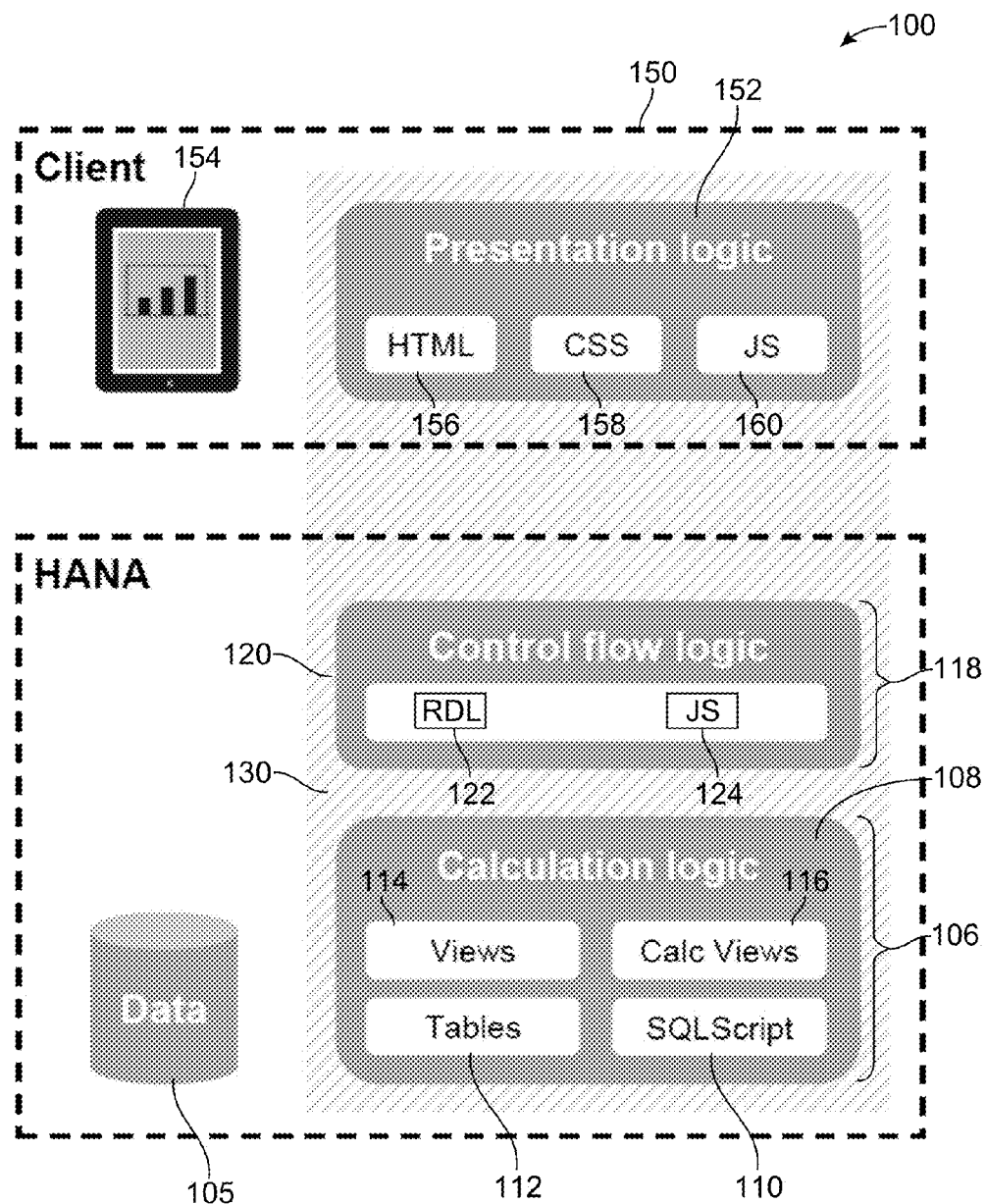
FIG. 1 shows a simplified view of a database system according to an embodiment.

FIG. 1 shows a simplified view of a database system 100, according to an embodiment. In particular, the database system 100 comprises data 105 of the database itself, organized according to a relational model.

A lower layer 106 of the database system 100 comprises calculation logic 108 that is designed to interact with the data 105 itself. Such calculation logic 108 may be performed by various engines (e.g. SQL engine, calculation engine, SQL script) in order to provide basic data definition and processing based on the relational model. Such basic data definition can include defining of data types making up the database, associated metadata, and the database structure (e.g. columns, tables). The lower layer 106 of the database system may include SQL script 110, as well as data structures such as tables 112, views 114, and calculation views 116.

The embodiment presented in FIG. 1 shows HANA, the in-memory database available from SAP AG of Walldorf, Germany, implemented as the database. However, embodiments are not limited to use with this particular database. Examples of other in-memory databases include, but are not limited to, the SYBASE IQ database also available from SAP AG; the Microsoft Embedded SQL for C (ESQL/C) database available from Microsoft Corp. of Redmond, Wash.; the Exalytics In-Memory database available from Oracle Corp. of Redwood Shores, Calif. etc.

Further, while the embodiment presented in FIG. 1 shows the database as comprising an in-memory database, various embodiments could be employed in conjunction with conventional disk-based database systems.

An application layer 118, overlying the calculation logic 108 of the database system 100 comprises control flow logic 120. The control flow logic 120 may be implemented utilizing River Definition Language (RDL) 122 and JavaScript (JS) 124 to reference model concepts such as entities and relationships that are not reflected in basic SQL. This control flow logic 120 may further comprise common languages for defining and consuming data across different containers (e.g. native, ABAP, Java).

As shown in FIG. 1, in order to facilitate the sharing of information across such different containers and thereby promote a more unified environment, the database system, according to embodiments, may further comprise a Core Data Services (CDS) component 130. CDS component 130 comprises a common set of domain-specific languages (DSL) and services. The CDS component 130 allows defining and consuming semantically rich data models as an integral part of the database structure, thereby permitting data modeling as well as the retrieval and processing of data to be raised to a higher semantic level that is closer to the conceptual thinking of domain experts. The role of the CDS component 130 is discussed in detail further below.

FIG. 1 further shows client 150 in communication with the HANA in-memory appliance available from SAP AG. The client 150 includes presentation logic 152 to provide an output 154 comprising data 105 of the underlying database structure, in a form desired by a user. Here, the output 154 is shown as a vertical bar chart, but of course this represents only one of a multitude of different ways in which the data may be communicated to a user. The presentation logic 152 may communicate such output in the form of HTML 156, cascading style sheets (CSS) 158, and/or JavaScript 160, or a variety of other user interface technologies.

Figure 2:
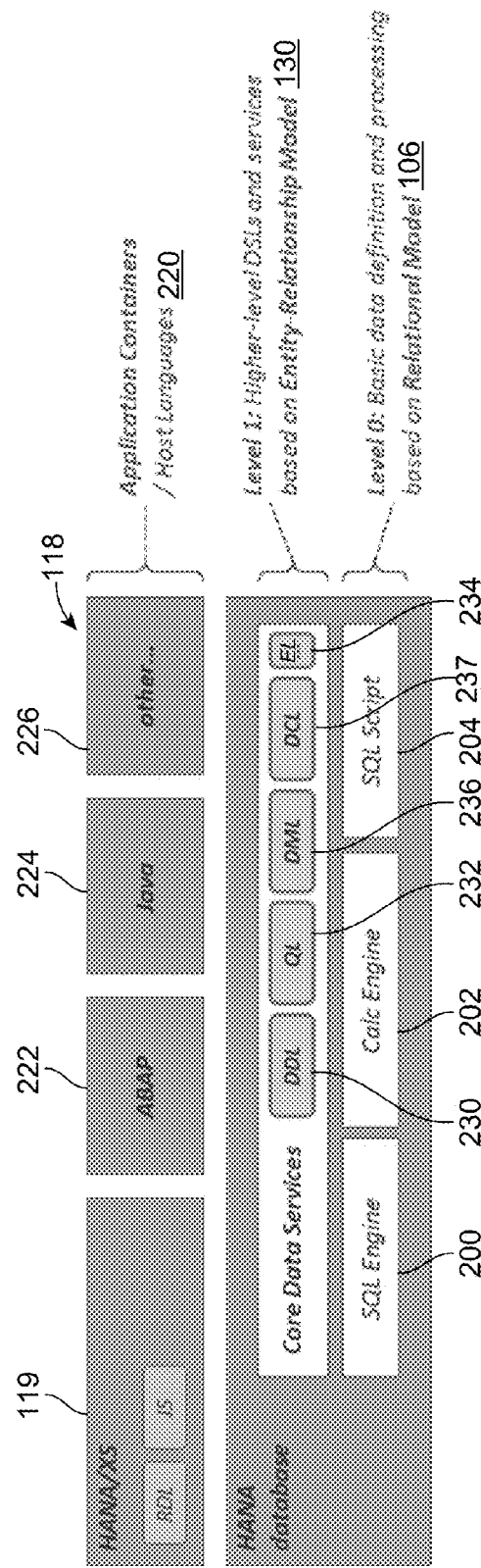
FIG. 2 shows an enlarged view of the database structure of FIG. 1.

FIG. 2 shows an enlarged view of the HANA in-memory database structure of FIG. 1. In particular FIG. 2 shows SQL engine 200, calculation engine 202, and SQL script 204, as part of the lower layer 106 that performs basic data definition and processing based upon the relational model, according to which the data 105 of the database is organized. FIG. 2 also shows the application layer 118 of the database structure of FIG. 1, including the RDL and JS elements of a query engine 119. The application layer 118 further comprises application containers and other host languages 220, including ABAP 222, Java 224, and others 226.

FIG. 2 further shows the CDS component 130 situated between the lower layer 106 and the application layer 118. As illustrated in this figure, the CDS component 130 can be leveraged in any consuming stack variant (stack of software layers located on top of each other), as implemented through the application layer 118. Specifically, services in higher layers can use/consume the services of lower layers. Here, because the application layer sits on top of a data layer in which the CDS component resides, definition and consumption of the semantically rich higher-level models is allowed.

In particular, the CDS component 130 implements higher-level Domain Specific Languages (DSLs) and services based on an entity-relationship model (ERM). The Data Definition Language (DDL) 230 is used for defining semantically rich data models, including the data types, associated metadata, and database organization (e.g., columns and tables). As mentioned throughout, according to embodiments the DDL may be extended to further enrich these data models through the use of entities and annotations.

The Query Language (QL) 232 is used to conveniently and efficiently read data based on data models. It is also used to define views within data models. The role of the QL and its relation to the DDL is further illustrated in connection with FIG. 3.

The Expression Language (EL) 234 is used to specify calculated fields, default values, constraints, etc. within queries. These calculated fields, default values, and constraints may be specified as well as for elements in data models.

Other elements of the CDS component 130 can include Data Manipulation Language (DML) 236 and a Data Control Language (DCL) 237, both of which may be used to control access to data.

Figure 3:
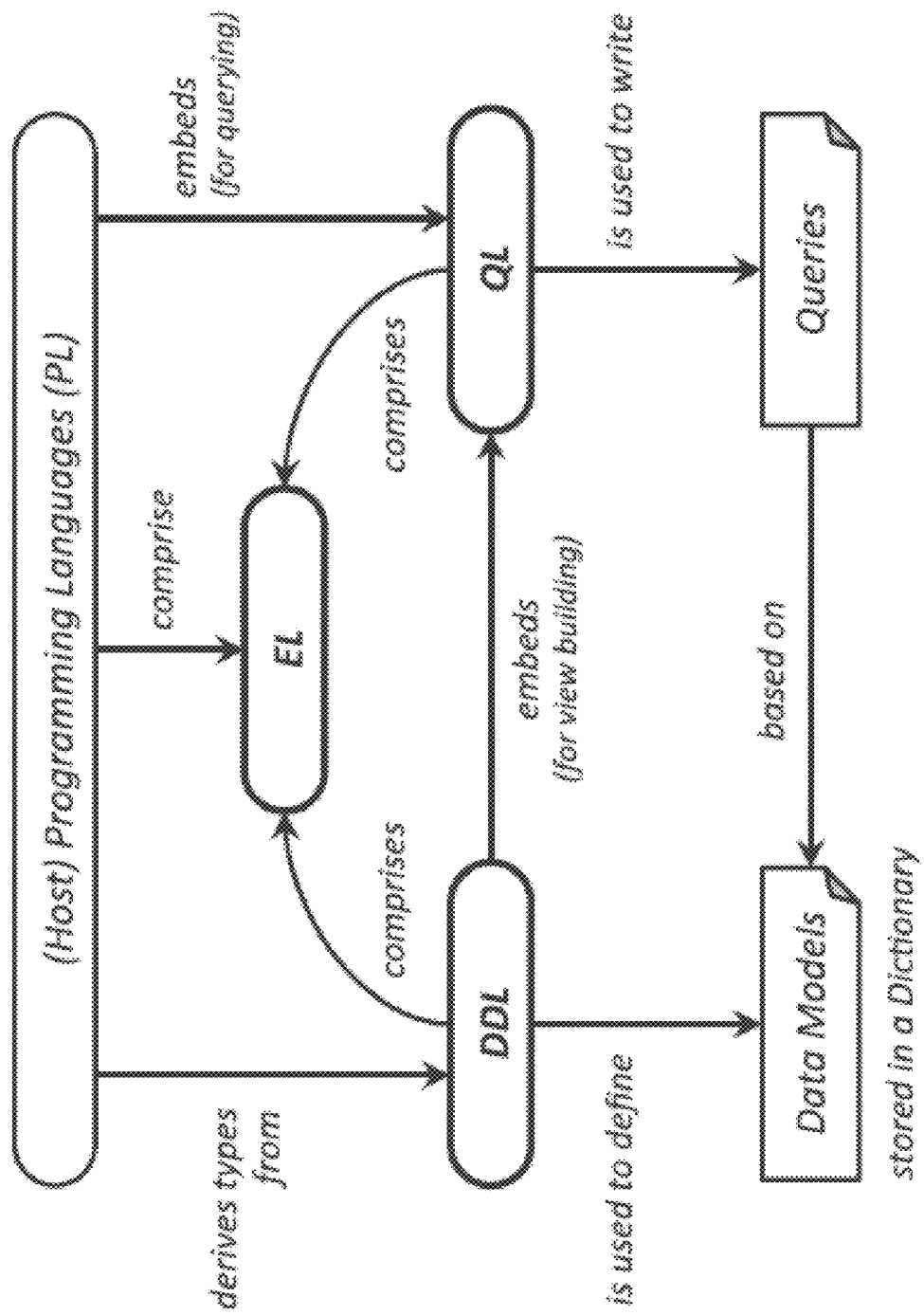
FIG. 3 illustrates relationships between individual languages making up a language family useful for interacting with a database.

Embodiments as described herein may distinguish between the domain-specific languages DDL, QL, and EL as members of a language family. This approach fosters considerations such as modular design, incremental implementation, and reuse. FIG. 3 is a simplified view illustrating relationships between these language family members. A consistent language experience across the members of the family of FIG. 3, can be achieved by ensuring the languages follow a common style. This can extend to the host programming language, with expressions in DDL, QL, and EL code, adopting the same syntax.

Utilization of application level domain language(s) as has been described above, can offer certain benefits. One possible benefit is that the application domain level language can avoid the use of "inefficient" and error-prone code.

Take, for example, the following simple data model describing employee information:

```
entity Employee {
    name : String(77);
    salary : Amount;        // a structured type
    orgunit : Association to OrgUnit;
    addresses : Association to Address[0..*] via entity
    Employee2Address;
    homeAddress = addresses[kind=home];  // introduced later on
}
```

```
entity OrgUnit {
    name : String(111);
    costcenter : String(44);
    manager: Association to Employee;
    parent: Association to OrgUnit;
}
entity Address {
    key streetAddress; key zipCode; city;   // omitted type defs
    kind : enum { home; business; }
}
```

Under some circumstances, it may be desired to write a query statement as follows:
SELECT id, name, homeAddress.zipCode FROM Employee WHERE . . .

Within that sample snippet, path expressions along relationships are used to fetch data from an associated entity. In the simple data model above, the above query statement is equivalent to the following standard SQL statement:

```
SELECT e.id, e.name, a.zipCode FROM Employee e
LEFT OUTER JOIN Employee2Address e2a ON e2a.employee = e.id
LEFT OUTER JOIN Address a ON e2a.address = a.id AND
a.type='homeAddr'
WHERE ...
```

This statement, however, may already be too complex for many application developers. Thus, code patterns similar to that given below, may be used in some pseudo languages:

```
customers = SELECT * FROM Customer
foreach c in customers do
    write c.id
    write c.name
    addresses = SELECT * FROM Address a, $Customer2Address c2a
        WHERE a.id = c2a.address AND c2a.customer = :c.id
    foreach a in addresses do
        if a.type = 'homeAddr' then write a.zipCode
    end
end
```

There are several issues with the code presented immediately above. One issue is the use of an imperative coding style with loops in loops, resulting in 1+n queries being executed or too much data being fetched with a SELECT * statement.

The above code represents only a relatively simple case. A more complex case is found in the following example:

```
SELECT FROM OrgUnit[boardarea='TIP']
    .employees[salary>'$100,000'] {
        addresses[kind=home].city, count(*)
    }
```

The preceding cases illustrate the importance of increasing expressiveness of the languages used in application development (here, the query language). This allows the intent of application developers to be captured, rather than being buried under substantial volumes of imperative boilerplate coding.

Such expressiveness is in turn is fundamental to having optimizations applied by the query engine (in a manner analogous to functional programming vs. imperative programming). This can affect system characteristics, such as its overall performance and scalability.

Further, a language's ability to allow developers to draft concise and comprehensive code can increase developer productivity. It can also reduce the risk of mistakes and also enhance readability, and thus increase the maintainability of the code.

In order to write concise and readable query statements, it is desirable to enrich the data definitions with sufficient metadata (e.g. about associations, semantic types, etc.) Accordingly, embodiments seek to extend the DDL to define data definitions with sufficient metadata, and seek to extend the QL to leverage such definitions.

DDL and QL are declarative, domain-specific languages providing developers with concise ways to express their models and queries. Certain concepts may originate from entity-relationship modeling (ERM). By adding native support for such concepts in the underlying engine of the database, embodiments avoid the impedance mismatch induced by the translation of conceptual models based on ERM, into implementations based upon a plain relational model. In particular, writing concise and comprehensive code reduces risks of mistakes and increases readability and maintainability.

Moreover, as the concepts of entity-relationship models may lie at the core of many higher-level models, embodiments are able to capture the semantics of other data models (e.g., RDL-based models), and share those semantics with database modelers, and/or ABAP or Java consumers. This reduces fragmentation and the loss of semantics.

In addition, since ERM is also the chosen basis for technologies like OData EDM, embodiments can facilitate mapping entities and views to OData entity sets.

Embodiments may employ a functional approach that is based on standard SQL. In particular, the comprehensive, domain-specific nature of DDL and QL allows capturing the intent of application developers, thus avoiding a lack of clarity regarding that intent which can result from large volumes of imperative boilerplate coding. This follows the principles of functional programming and is important for optimizations.

The functional approach may be inherited from SQL. A SQL SELECT statement declares which sub-set of an overall data model is of interest as projections and selections. It may be left to the query engine to determine optimal execution, including parallelizing as appropriate.

In contrast with imperative object traversal patterns, embodiments can speed up many data retrieval use cases. While many of those retrieval cases are not individually expensive, the cumulative impact of this streamlining can have significant impacts on scalability, as it affects all requests over long periods of time.

Embodiments address some of the complexity offered by standard SQL to typical application developers by raising the basis of SQL from plain relational models, to the level of conceptual models. This is done by providing native support for ERM in the database system. In this manner, the use of SQL may be reestablished for most application developers, not only for those with the SQL expertise for specific optimization tasks.

Embodiments employ associations in DDL. Specifically, the DDL allows definition of data models as entity-relationship models on a semantically rich level that is close to actual conceptual thought. To achieve this over the conventional relational model of standard SQL, certain concepts are captured by the embodiments described herein.

Figure 4:
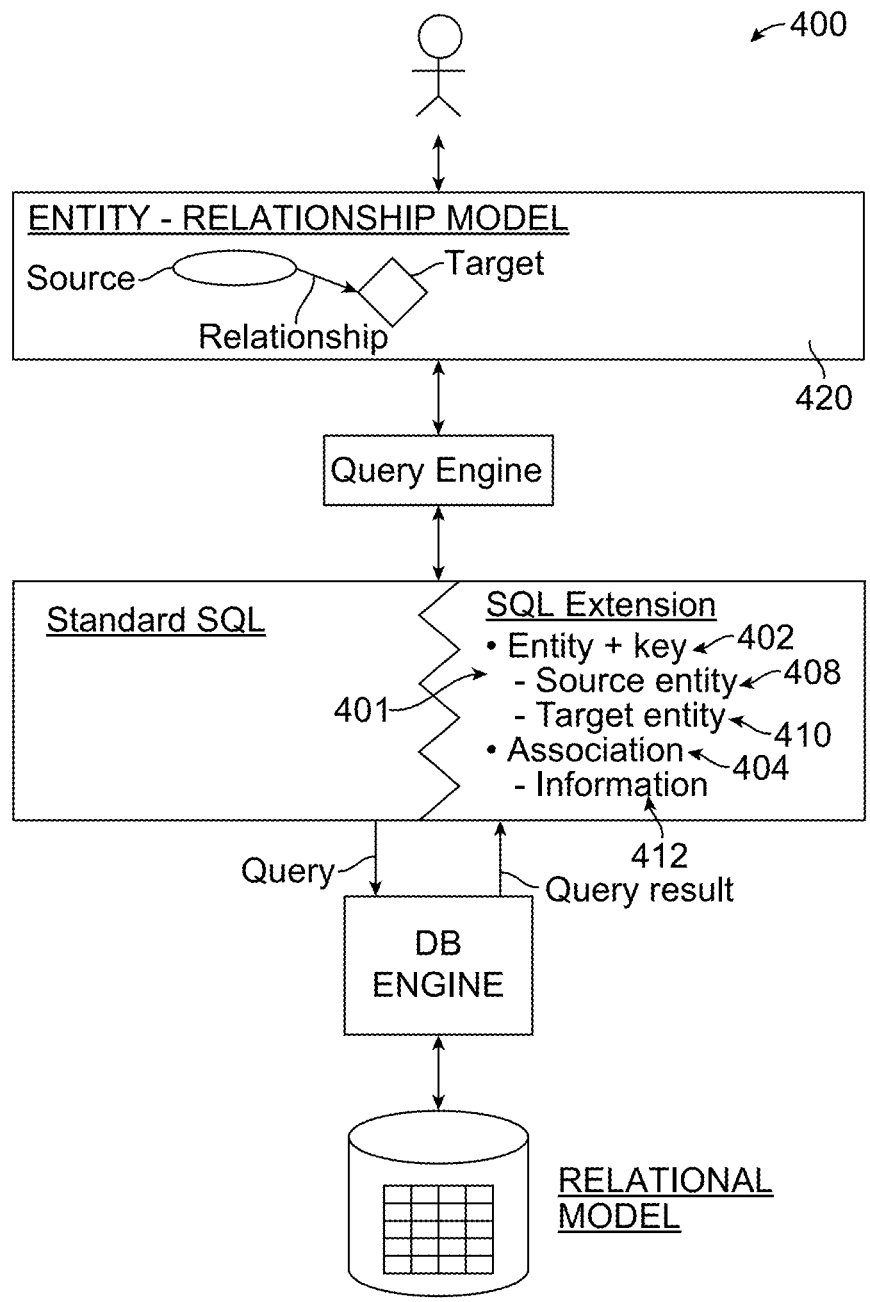
FIG. 4 is a simplified view showing an approach for extending SQL according to embodiments.

FIG. 4 is a simplified view showing an approach for extending SQL according to embodiments. As shown in the system 400 of FIG. 4, one concept underlying embodiments as described herein, is the use of entities 401 with structured types, in contrast with a conventional relational database, which uses only flat tables. Entities are structured types with an underlying persistency and a unique key 402. Structured types are records of named and typed elements. An entity key is formed of a sub-set of the elements of the entity that uniquely identify instances. Views are entities defined by a query, which essentially defines a projection on underlying entities.

Another concept underlying entities as described herein, involves employing associations 404 on a conceptual level. This approach contrasts with the conventional use of hand-managed foreign keys. Associations define relationships between entities and are specified by adding an element with an association type to a source entity 408 that points to a target entity 410. As shown in the FIG. 4 the relationship implemented by the association type, between source entity type and the target entity type, reflects the actual relationship between entities in the overlying ERM model 420. Using the type definition, associations may capture metadata about relationships present in the ERM in a 'reflectable' way. According to such a reflectable characteristic, a consuming portion of code receiving a piece of data from the database can get back to the type information (i.e., metadata) provided for the respective elements in the data model.

The association may be complemented by optional further information 412 (e.g., regarding cardinality, which keys to use, additional filter conditions, etc.) up to a complete JOIN condition. According to embodiments the clause-based syntax style of standard SQL may be adopted for specifying the various parameters without sacrificing readability.

In addition, the extended DDL works with custom-defined Types instead of being limited to primitive types only. The extended DDL may also add other enhancements, such as annotations, to enrich the data models with additional metadata, constraints, or calculated fields.

Figure 5:
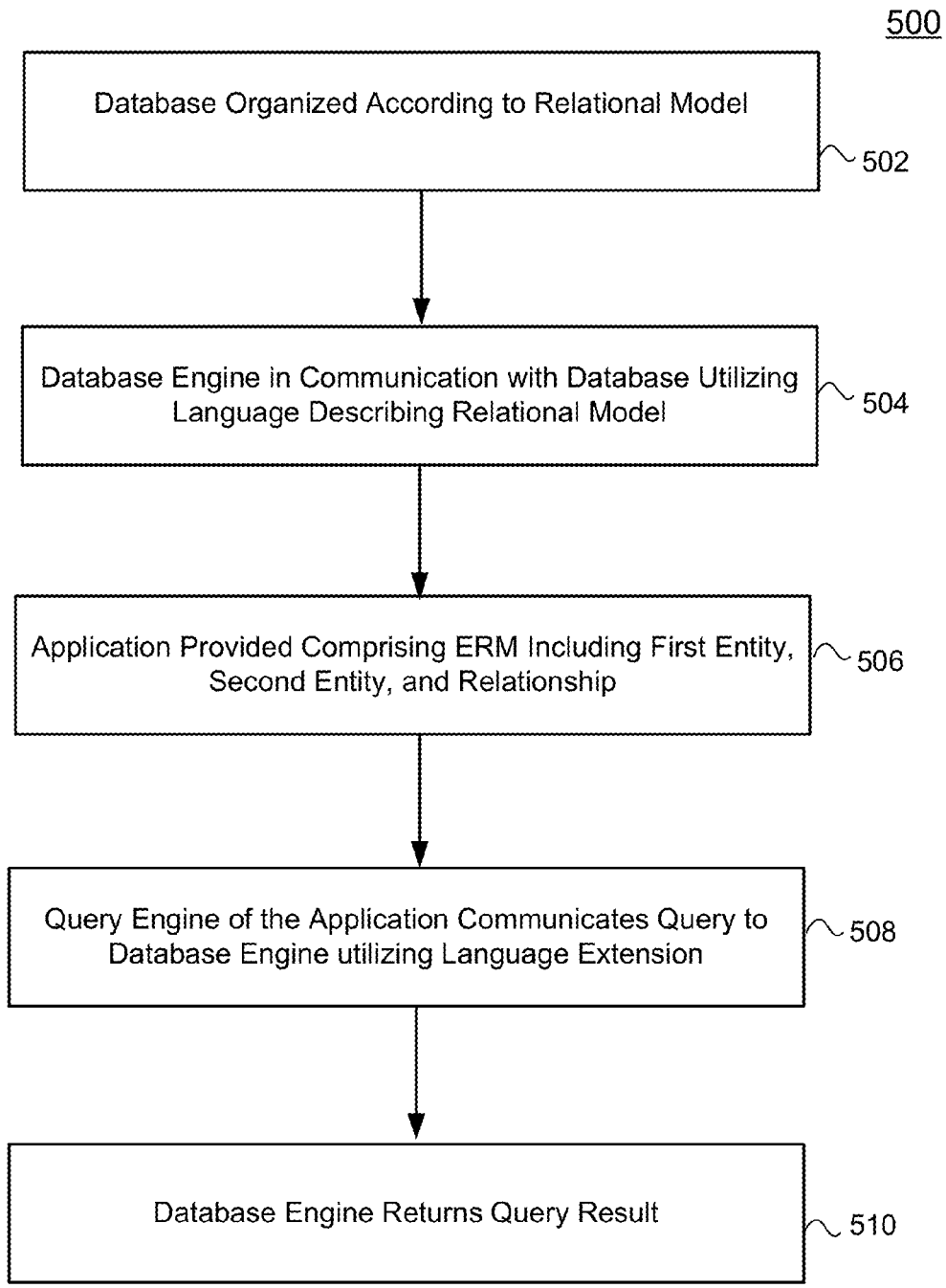
FIG. 5 is a simplified diagram illustrating a process flow according to an embodiment.

FIG. 5 is a simplified diagram illustrating a process flow 500 according to an embodiment. In a first step 502, a database is provided comprising data organized according to a relational model.

In a second step 504, a database engine is provided in communication with a database utilizing a language describing the relational model. In a third step 506, an application is provided comprising an entity-relationship model (ERM) including a first entity, a second entity, and a relationship between the first entity and the second entity.

In a fourth step 508, a query engine of the application communicates a query to the database engine utilizing a language extension providing the entity and relationship components of the ERM. The language extension may comprise a first structured entity type including a first key and indicating the first entity, a second structured entity type including a second key and indicating the second entity, and a third structured association type reflecting the relationship. The association type may be complemented with further additional information.

In a fifth step 510, the database engine returns a query result to the query engine based upon the language extension.

EXAMPLES

Some examples of extension of the SQL database language to provide entities and associations of ERMs, are now given below.

```
entity Address {
    owner : Association to Employee;        // can be used for :m
                                             associations
    streetAddress; zipCode; city;            // snipped type defs
    kind : enum { home, business };
}
entity Employee {
    addresses : Association[0..*] to Address via backlink owner;
    homeAddress = addresses[kind=home]; // → using XPath-like filter.
}
Association to Address;
Association to Address { zipCode, streetAddress };
Association [0..*] to Address via backlink owner;
Association [0..1] to Address via backlink owner where kind=home;
Association [0..*] to Address via backlink owner where zipCode like
'76*';
Association [0..*] to Address via entity Emp2Adr;
Association [0..1] to Address via entity Emp2Adr where kind=home;
Association [0..*] to Address on owner=this;
Association [0..*] to Address on Address.owner._id = Employee._id;
Association to Address on owner=this AND kind=home;
```

For specifying syntax, embodiments may use a derivate of the Backus Naur Form (BNF) family of metasyntax notations used to express a context-free grammar, and which can be relied upon to make a formal description of a computer language. The basic constructs may be summarized as follows:

| Construct | Notation | Comments |
| --- | --- | --- |
| definition | = | Definitions are written with a single equals sign, e.g. Rule = ... |
| extension | += | Extends a definition introduced before by additional rules |
| terminal symbol | keyword | Language keywords are set in bold red |
| terminal character | "." | Single-character language symbols are set in double quotes |
| alternation | ... \| ... | Pipe symbols separate alternatives, e.g. foo and bar \| zoo w/ car |
| grouping | ( ... ) | Parenthesis group constructs, e.g. ( foo \| bar ) with car |
| option | [ ... ] | Square brackets designate optional constructs, e.g. [ optional ] |
| repetition | ...* | 0+ repetitions are indicated by appended "*", e.g. zeroOrMore* |
| repetition | ...+ | 1+ repetitions are indicated by appended "+", e.g. oneOrMore+ |
| comment | -- ... | Comments start with a double-dash, e.g. -- this is a comment |

Syntax for SQL extended to include entities and associations as described herein, may be described as follows:

```
AssignedType += | Association Type
AssociationType = Association [ cardinality ] ( to targetEntity ) [
    managedJoin | unmanagedJoin ]
cardinality = "[" [( maxs |* ) "," ] [ min .. ] ( max|* ) "]" | "[ ]"
targetEntity = QualifiedName
managedJoin = ( forwardLink | backwardLink | mediatedLink )
    [ where filterClause ]
    forwardLink = "{" foreignKeys "}"
    backwardLink = via backlink reverseKeys
    mediatedLink = via entity entityName
    foreignKeys = targetKeyElement [ AS alias ] [ "," foreignKeys ]
    reverseKeys = targetKeyElement             ["," reverseKeys ]
    targetKeyELement = elementName ( "." elementName )*
unmanagedJoin = on filterClause
```

From DDL perspective, association is a new primitive type that is specified with the type name Association, followed by several parameter clauses to specify requisite metadata. These parameter clauses are as follows:

Cardinality allows specifying the relationship's cardinality in the form of [min . . . max], with max=* denoting infinity and "n" as a shorthand for [0 . . . *]. As a default, if omitted [0 . . . 1] is used as the default cardinality. An example is:

Association[ ] to Address via backlink owner;

To targetEntity specifies the association's target entity. A qualified name is expected, referring to another entity (incl. views). Specifying the target is mandatory—there is no default.

{foreignKeys} allows specifying a combination of alternative key elements in the target entity, to be used to establish the foreign key relationship. Where a key element is in a substructure on the target side, an alias name is to be specified. Further details are provided below regarding associations represented as foreign key relationships.

If omitted, the target entity's designated primary key elements are used. The following are examples:

```
Association to Address { zipCode, streetAddress };
Association to Address { some.nested.key AS snk };
```

Another parameter clause is VIA backlink: reverseKeys. For 1:m associations, it is mandatory to specify target elements, which are expected to be a key combination matching the source's primary keys or an association referring to the source entity. An example is:

Association to Address via backlink owner;

Another parameter clause is VIA entity: entityName. For m:m associations, it is mandatory to specify a link table's entity name. That name can either refer to a defined entity or a new entity will be created as follows:

```
entity <entityName> {
    <nameOfSourceEntity>    : Association to <SourceEntity>;
    <nameOfTargetEntity>    : Association to <TargetEntity>;
}
```

If the data model contains an explicit definition of the link table entity, that entity must adhere to the template shown above. It can in addition add other elements. An example is given below:

```
Association to Address via entity Employee2Address;
entity Employee2Address {
    employee : Association to Employee;
    address : Association to Address;
}
```

The WHERE filterClause allows specifying additional filter conditions that are to be combined with the JOIN conditions. This can be especially relevant in combination with VIA backlink or entity clauses. Depending on the filterCondition this can reduce a base :m relationship to one with a :1 cardinality. An example is given below:

Association to Address[0 . . . 1] via backlink owner where kind=home;

The ON filterClause allows fully specifying an arbitrary JOIN condition, which can be any standard SQL filter expression. Using this option results in the respective association being user-managed. That is, no foreign key elements/fields are created automatically. The developer is expected to explicitly manage the foreign key elements, including filling them with appropriate foreign key values in write scenarios. An example is given below:

Association to Address on owner=this;

Element names showing up in VIA, WHERE, and ON clauses, are resolved within the scope of the target entity's type structure. Siblings can be referred to by prefixing an element with ".". Elements from the scope above can be referred to by prefixing an element with " . . . ", etc.

In addition, the outer entity's top-level scope can be referred through the pseudo variable "this", described further below in connection with Pseudo Variables in QL.

According to embodiments, associations are represented as foreign key relationships. In the relational model, associations are mapped to foreign key relationships. The foreign key elements are usually created automatically as described in the following sections. In particular, an element with association type is represented as a nested structure type containing foreign key elements corresponding to the target entity's primary key elements—i.e., having the same names and types. The following are examples of definitions which may be given:

```
entity Employee { ...
    address1     : Association to Address;
    address2     : Association to Address { zipCode, streetAddress };
    addresses    : Association to Address[0..*] via backlink owner;
    }
```

In this example, the association elements would implicitly be defined with a nested structure type containing foreign key elements in the :1 cases (plus additional metadata about the association) as follows:

```
entity Employee { ...
    address1 {
        _ID                 : type of Address._ID;
    }
    address2 {
        zipCode             : type of Address.zipCode;
        streetAddress       : type of Address.streetAddress;
    }
    addresses { /* none at all since :m */ }
}
```

Following the rules for mapping structured types to the relational model as specified above, the underlying table would be created:

```
CREATE TABLE Employee ( ...
"address1._ID" Integer,
"address2.zipCode" String(...),
"address2.streedAddress" String (...)
)
```

Rules for representing associations in the persistence model may apply, as indicated in the table below:

| If . . . is specified | for to-one cases, e.g. [0 . . . 1] | for to-many cases |
|---|---|---|
| <no join clause> | Nested foreign key elements are created for target's primary key elements. | not allowed |

-continued

| | |
|---|---|
| {foreignKeys} | Nested foreign key elements are created for the elements specified in foreignKeys. |
| VIA backlink reverseKeys | No nested foreign keys are created; instead the reverseKeys are expected to link back from target to source. |
| VIA entity entityName | No nested foreign keys are created; instead the link table named entityName is created/used as described above. |
| ON joinCondition | No nested foreign key elements are created; managing the foreign key relationship is completely up to the developer. |

Consistent with the approach in SQL, no plausibility checks are enforced (e.g., checking whether target key elements specified in {foreignKeys} fulfill the uniqueness requirements). Also, no implicit referential integrity checks are enforced at runtime.

According to embodiments, associations may be in custom-defined types. As associations are special types, they can principally be defined not only for elements in entity definitions, but in type definitions in general. For example, the following definition of the association Amount.currency is valid DDL content:

```
entity Currency {        // List of pre-defined Currencies
  key code : String(3);
  description : String(33);
}
type Amount {
  value : Decimal(10,2);
  currency : Association to Currency;
}
```

An actual relationship between entities is established when using the type Amount for an element within an entity definition, as shown in the following:

```
entity Employee {
  salary : Amount;
  address : Association to Address;
}
```

The code shown above essentially indicates that the entity Employee has two associations—one association is to Address and another association is to Currency within its salary element.

Associations in custom-defined types may only be supported for a simple "to-one" relationship with a foreign key on the source side. That is, associations with via backlink or via entity clauses may not be supported for elements in custom-defined types.

Associations in Query Language (QL) are discussed below.

Querying Associations with :m Cardinality

Resolving associations or compositions with 1:m cardinality using path expressions or nested projection clauses with the flattening operator "." in place results in flat result sets with duplicate entries for the 1: side, is in line with standard SQL JOINS and the relational model.

As examples, in the following queries, "addresses" refers to an association with "to-many" cardinality [0 . . . *]:

```
SELECT name, addresses.city FROM Employee;
SELECT name, addresses.{ zipCode, city } FROM Employee;
```

The result sets for the example queries above, are shown below, each with the same value for name repeated/duplicated for each found entry on the :m Address side:

```
<Result Set 1> { name, city }
<Result Set 2> { name, zipCode, city }
```

Embodiments also allow the return of 'Deep' Result Sets. Specifically, in addition to the standard flattening behavior, the introduction of nested projection clauses and structured result sets principally allows expression of 'deep' queries along :m associations. These deep queries return 'real deep' result sets having the 1: sides elements on a top level, with nested tables/sets for the :m sides.

For example, the deep query:
SELECT name, addresses {zipCode, city} FROM Employee;
would be expected to return a result set with a nested collection as shown below:

```
<Result Set> {
  name,
  addresses : <collection of> Address { zipCode, city }
}
```

Such deep querying may provide certain benefits. One possible benefit is to allow retrieving larger structures through a single query.

Currently, in the absence of deep querying, such larger structures may frequently be obtained in a brute-force approach, through 1+n queries with n being the number of records returned by a 1: side query. This is detrimental to performance, particularly if such a query spans several levels of to-many associations.

While the other extensions can be realized by translating to standard SQL queries, this one requires adding special support deep within the query engine. The absence of such support may preclude using to-many associations in the non-flattened way. This is discussed further below in the associations of FROM clauses, regarding how association trees can be traversed.

Associations in WHERE Clauses

Associations can arise not only in projection clauses but also in filter conditions in WHERE clauses. Respective comparison operators may be enhanced to support associations, as depicted in the following examples:

```
1. SELECT ... from Emloyee WHERE orgunit={ _id: '4711' };
2. SELECT ... from Emloyee WHERE homeAddress={
  zipCode: '76149', streetAddress : 'Vermontring 2'
};
3. SELECT ... from Emloyee WHERE orgunit='4711';
4. SELECT ... from Emloyee WHERE homeAddress.city like
  'Wall%';
```

```
5. SELECT ... from Emloyee WHERE homeAddress.city IN (
   'Walldorf', ...
);
6. SELECT ... from Emloyee WHERE address IS NULL;
7. SELECT ... from Emloyee WHERE address[kind=home].city =
'Walldorf';
8. SELECT ... from Emloyee WHERE homeAddress =
addresses[kind=home];
```

Several issues arising within the examples immediately above, may be worthy of note. In connection with:

ad 1,2: A record literal can be passed to a comparison with an association, with elements that match the combination of the foreign keys.

ad 3: Support for Association type in QL includes automatic coercions of typed scalars or string representations thereof to single-key associations.

ad 4: One can also refer to the individual key values using standard path expressions.

ad 5ff: Other SQL comparison operators can be used, such as LIKE, IN, IS NULL, . . .

ad 8: It can be combined with XPath-like filter expressions.

ad 9: It can be combined with compare associations, provided they are assignable.

The above provides just a few examples to give the idea. In general, every condition that is possible with standard SQL expressions shall be possible to do with associations as well, including sub queries with exists and not exists, etc.

Associations in FROM Clauses

Embodiments may also allow associations in FROM clauses. Specifically, host languages may provide support for representing associations as typed variables or elements. This is described below in connection with association types in host languages.

Accordingly, one can traverse along associations, as shown in the following examples (in some pseudo language):

```
var daniel = SELECT name, homeAddress FROM Employee WHERE
name='Daniel';
// ... and somewhat later, maybe at some other place in an
application...
var addresses = SELECT * FROM Address WHERE
this=daniel.homeAddress;
```

The expression this=<an association> can be used. The comparison this=<an association> can be retrieve an entity by a given association. The pseudo variable this is always an alias for the entity given in the FROM clause. Therefore, the statement above actually resolves to:

SELECT * FROM Address this WHERE this=daniel.homeAddress;

The comparison this=<an association> compares a queried entity with a given association—the association must be of type association to <queried entity>[ . . . ]. This expands to a WHERE clause corresponding to the ON condition resolved from the association. In this case it would actually resolve to:

```
SELECT * FROM Address this
   WHERE this.zipCode = daniel.homeAddress.zipCode
      AND this.streetAddress = daniel.homeAddress.streetAddress
      AND this.type = 'home';
```

Embodiments may also allow the use of SELECT from association. Specifically, association-traversal code patterns like the one below are frequently seen:

SELECT * from Address WHERE this=daniel.homeAddress;

An association in general, and a programming language variable with association type support in particular, carries all information about a target record—essentially providing information as to which entity goes with which key. Thus equivalent to the query above, embodiments allow the shorthand below for traversing associations:

SELECT * from daniel.homeAddress;

In general, a query statement of the form SELECT . . . from <someAssociation> expands to:

```
SELECT ... from <someAssociation>.<targetEntity> WHERE
   this=<someAssociation>;
```

Here, <targetEntity> signifies the metadata associated with the association corresponding to the target entity specified in the association's declaration using the ON targetEntity clause.

JOINs Declare Ad-Hoc Associations

Embodiments allow JOINs to declare ad-hoc associations. In the case of a missing association, the standard JOIN <target> ON <join condition> clauses as introduced in SQL-92 are still supported, which align with the extensions introduced above, as they naturally introduce associations in an ad-hoc fashion.

For example, in the data model given above, the entity Employee has an association homeAddress, but is lacking a similar association for businessAddress, which can be compensated for using a standard JOIN clause as follows:

```
SELECT FROM Employee e
   ASSOCIATION TO Employee2Address e2a ON e2a.employee = e
   ASSOCIATION TO Address businessAddress ON _id =
      e2a.address._id
AND kind=business
{
   ID, name,
   businessAddress { streetAddress, zipCode, city }
}
```

The expression may follow the syntax below:

```
JoinClause += | JOIN targetEntity [[AS] Identifier ]
   JoinConditionClauses
```

Other syntax is as discussed above in connection with associations in DDL.

JOIN clauses fit easily into the extensions in DDL and QL. JOIN clauses can be interpreted as an ad-hoc definition of missing associations.

In the example immediately above, the association businessAddress is added. This result is recognized if the projection clause of the example above is compared to that of the query applied to the domain model if the association were in place (below):

```
SELECT FROM Employee {
   ID, name,
   businessAddress { streetAddress, zipCode, city }
}
```

Embodiments also allow the use of simplified JOIN clauses. In particular, following the observation that JOINs essentially declare ad-hoc associations, embodiments allow JOINs to be declared using the same clauses that are used to declare associations in DDL. Given this, the above example can be written more easily as follows:

```
SELECT FROM Employee e
ASSOCIATION TO Address businessAddress VIA entity
Employee2Address
WHERE kind=business
{
  ID, name,
  businessAddress { streetAddress, zipCode, city }
}
```

Figure 6:
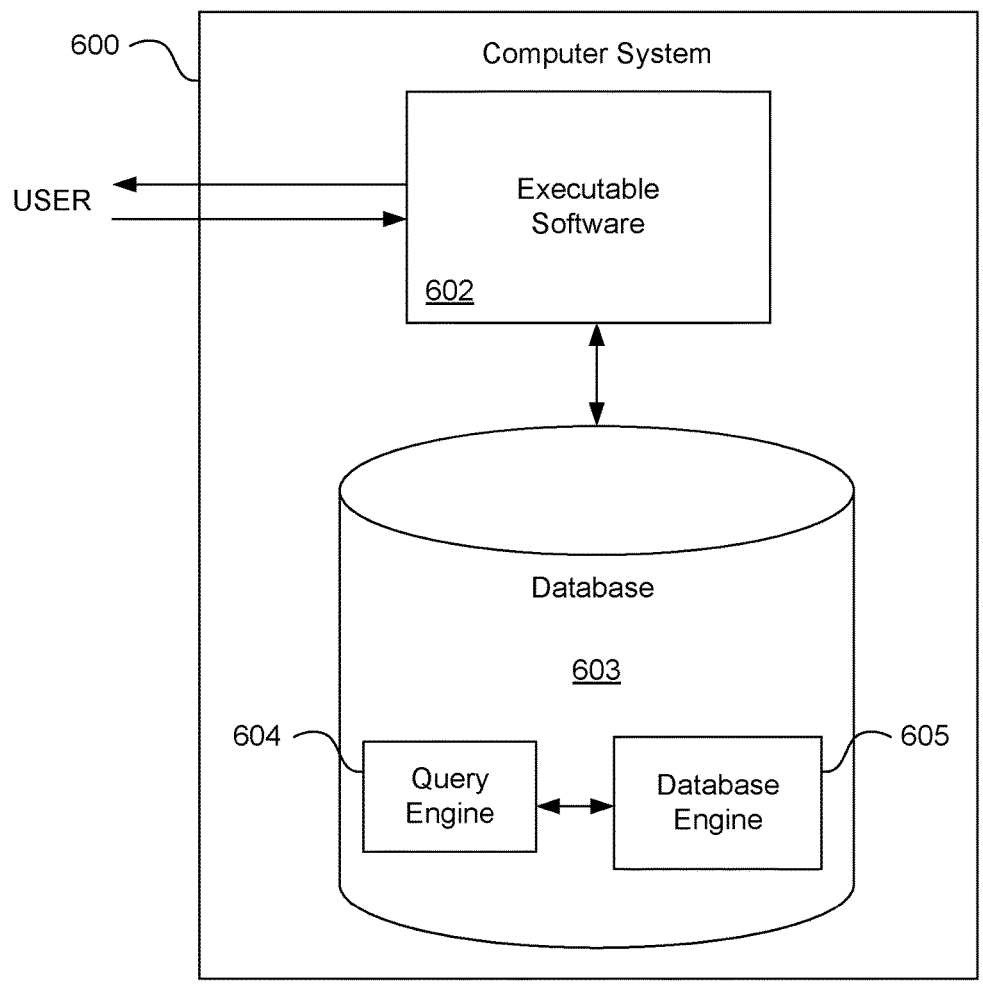
FIG. 6 illustrates hardware of a special purpose computing machine configured to provide enhancements that simplify querying according to an embodiment.

FIG. 6 illustrates hardware of a special purpose computing machine configured to provide enhancements that simplify querying according to an embodiment. In particular, computer system 600 comprises a processor 602 that is in electronic communication with a non-transitory computer-readable storage medium 603. This computer-readable storage medium has stored thereon code 604 corresponding to a query engine. Code 605 corresponds to a database engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
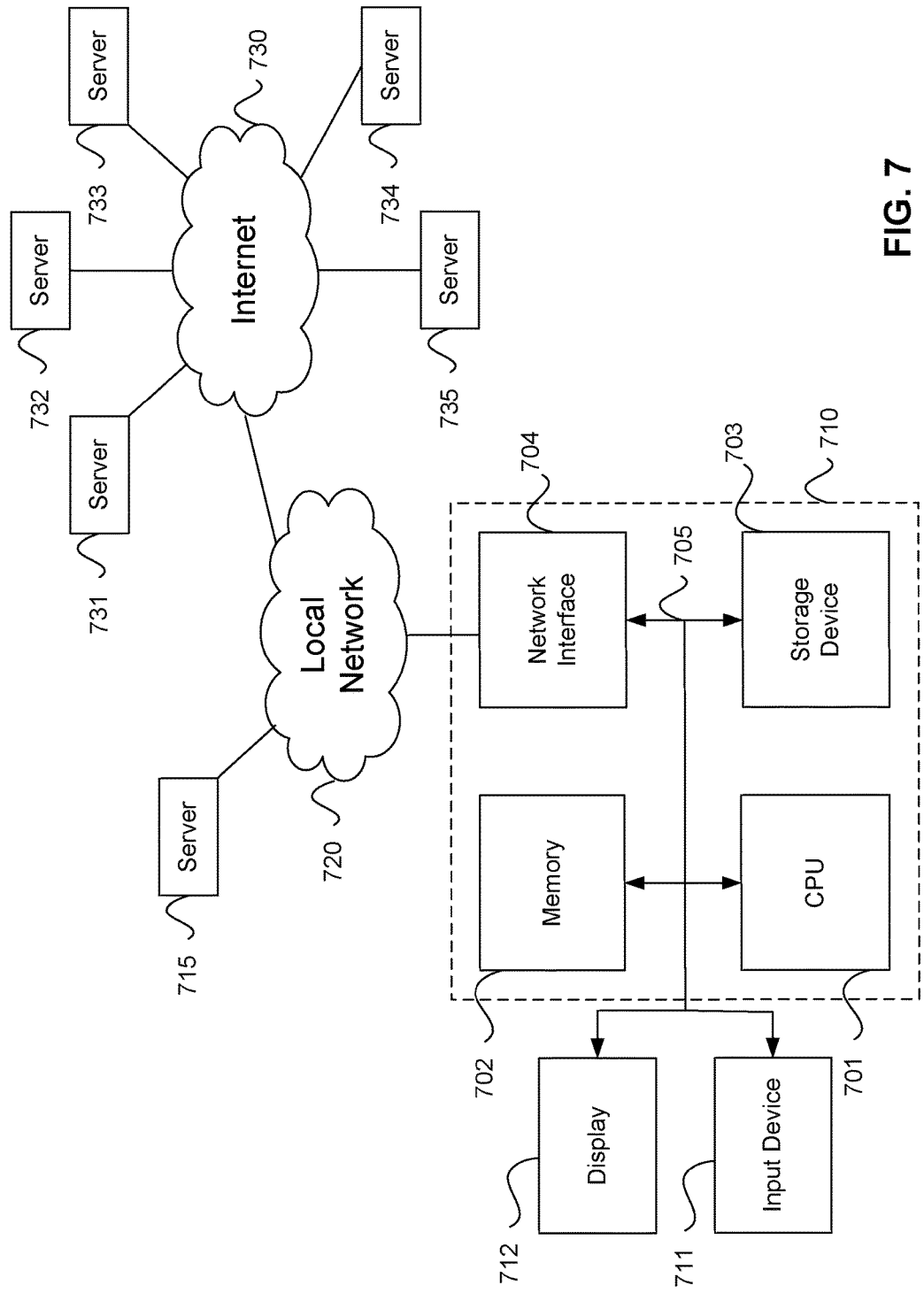
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system (710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing in a database layer, a database engine and a database comprising data organized according to a relational model;
providing in an application layer, an entity relationship data model and a query engine in communication with the database engine;
causing the database engine to receive from via the query engine a query in a database language that has been extended to include an entity type and an association, the query further comprising a path expression including a filter element suffix followed by nested projection clauses specifying a relationship between a specified entity and an associated entity;
causing the database engine to return to the query engine a query result set comprising data of the associated entity matching the nested projection clauses of the path expression,
wherein if the path expression includes an optional flattening symbol, the query result set comprises the data in a result set type structure that is flattened, and
wherein if the path expression omits the optional flattening symbol, the query result set comprises the data in the result set type structure that corresponds to the nested projection clauses; and
causing the database engine to store the data in the database according to the result set type structure.

2. The computer-implemented method of claim 1 wherein the path expression further comprises a shorthand factoring out an association path prefix.

3. The computer-implemented method of claim 1 wherein the database language is SQL.

4. The computer-implemented method of claim 3 wherein the query comprises SELECT and FROM clauses presented in a revised order.

5. The computer-implemented method of claim 1 wherein the database comprises an in memory database.

6. A non-transitory computer readable storage medium embodying a computer program for performing a method, said method comprising:
provide in a database layer, a database engine and a database comprising data organized according to a relational model;
providing in an application layer, an entity relationship data model and a query engine in communication with the database engine;
causing the database engine to receive via the query engine a query in a database language that has been extended to include an entity type and an association, the query further comprising a path expression including a filter element suffix followed by nested projection clauses specifying a relationship between a specified entity and an associated entity;
causing the database engine to return to the query engine a query result set comprising data of the associated entity matching the nested projection clauses of the path expression,
wherein if the path expression includes an optional flattening symbol, the query result set comprises the data in a result set type structure that is flattened, and
wherein if the path expression omits the optional flattening symbol, the query result set comprises the data in the result set type structure that corresponds to the nested projection clauses; and
causing the database engine to store the data in the database according to the result set type structure.

7. A non-transitory computer readable storage medium as in claim 6 wherein the path expression further comprises a shorthand factoring out an association path prefix.

8. A non-transitory computer readable storage medium as in claim 6 wherein the language is SQL.

9. A non-transitory computer readable storage medium as in claim 8 wherein the query comprises SELECT and FROM clauses presented in a revised order.

10. A non-transitory computer readable storage medium as in claim 6 wherein the database comprises an in memory database.

11. A computer system comprising:
one or more processors;
a software program stored on a non-transitory computer readable storage medium and configured to cause the one or more processors to:
provide in a database layer, a database engine and a database comprising data organized according to a relational model;
provide in an application layer, an entity relationship data model and a query engine in communication with the database engine;
cause the database engine to receive via the query engine a query in a database language that has been extended to include an entity type and an association, the query further comprising a path expression including a filter element suffix followed by nested projection clauses specifying a relationship between a specified entity and an associated entity;
cause the database engine to return to the query engine a query result set comprising data of the associated entity matching the nested projection clauses of the path expression,
wherein if the path expression includes an optional flattening symbol, the query result set comprises the data in a result set type structure that is flattened, and
wherein if the path expression omits the optional flattening symbol, the query result set comprises the data in the result set type structure that corresponds to the nested projection clauses; and
cause the database engine to store the data in the database according to the result set type structure.

12. A computer system as in claim 11 wherein the path expression further comprises a shorthand factoring out an association path prefix.

13. A computer system as in claim 11 wherein the language is SQL.

14. A computer system as in claim 13 wherein the query comprises SELECT and FROM clauses presented in a revised order.

15. A computer system as in claim 11 wherein the database comprises an in memory database.

* * * * *